US012684248B2

(12) United States Patent
Fujii

(10) Patent No.: US 12,684,248 B2
(45) Date of Patent: Jul. 14, 2026

(54) EXPOSURE CONTROL DEVICE, IMAGING APPARATUS, EXPOSURE CONTROL METHOD, AND PROGRAM OF PREVENTING INAPPROPRIATE VARIATION IN BRIGHTNESS

(71) Applicant: FUJIFILM Corporation, Tokyo (JP)

(72) Inventor: Masato Fujii, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 19 days.

(21) Appl. No.: 18/779,072

(22) Filed: Jul. 21, 2024

(65) Prior Publication Data

US 2025/0056127 A1    Feb. 13, 2025

(30) Foreign Application Priority Data

Aug. 10, 2023    (JP) ................................. 2023-131336

(51) Int. Cl.
| | |
|---|---|
| *H04N 23/73* | (2023.01) |
| *H04N 23/60* | (2023.01) |
| *H04N 23/611* | (2023.01) |
| *H04N 23/71* | (2023.01) |

(52) U.S. Cl.
CPC ........... *H04N 23/73* (2023.01); *H04N 23/611* (2023.01); *H04N 23/64* (2023.01); *H04N 23/71* (2023.01)

(58) Field of Classification Search
CPC ...... H04N 23/73; H04N 23/611; H04N 23/64; H04N 23/71; H04N 23/72; H04N 23/75; H04N 23/70

USPC ........................................................ 348/229.1
See application file for complete search history.

(56) References Cited

U.S. PATENT DOCUMENTS

| | | | | |
|---|---|---|---|---|
| 2012/0147205 A1* | 6/2012 | Lelescu | .................. | H04N 23/62 |
| | | | | 348/E5.024 |
| 2015/0043811 A1* | 2/2015 | Prabhudesai | ........ | H04N 23/741 |
| | | | | 382/164 |
| 2016/0239984 A1* | 8/2016 | Watanabe | ........... | G06F 16/5838 |
| 2019/0113332 A1* | 4/2019 | Nishimura | ........... | H04N 25/589 |
| 2020/0137281 A1 | 4/2020 | Omori | | |

FOREIGN PATENT DOCUMENTS

| | | |
|---|---|---|
| JP | 2008233470 | 10/2008 |
| JP | 2020072469 | 5/2020 |

* cited by examiner

*Primary Examiner* — Usman A Khan
(74) *Attorney, Agent, or Firm* — JCIPRNET

(57) ABSTRACT

According to the present disclosure, there is provided an exposure control device configured to acquire an image signal output from an imaging element; acquire a specific subject region in an image represented by the image signal; calculate a first exposure value of a set region that is set in the image and a second exposure value of the subject region; decide a first weight for the first exposure value and a second weight for the second exposure value based on first determination of determining importance of the subject region with respect to the set region and second determination of determining a positional relationship between the set region and the subject region; and calculate a third exposure value by performing weight addition on the first exposure value and the second exposure value using the first weight and the second weight.

17 Claims, 13 Drawing Sheets

OPERATING DEVICE ~13

~40

IMAGING SENSOR ~20

D

IMAGE ACQUISITION UNIT ~52

D

DISPLAY CONTROLLER ~53

D

IMAGING CONTROLLER ~51

SUBJECT REGION ACQUISITION UNIT ~55

RO

EXPOSURE VALUE CALCULATION UNIT ~56

RG

REGION DECISION UNIT ~54

E3

MAIN CONTROLLER ~50

DRIVER ~33

OPERATING DEVICE ~13

Figure 14:
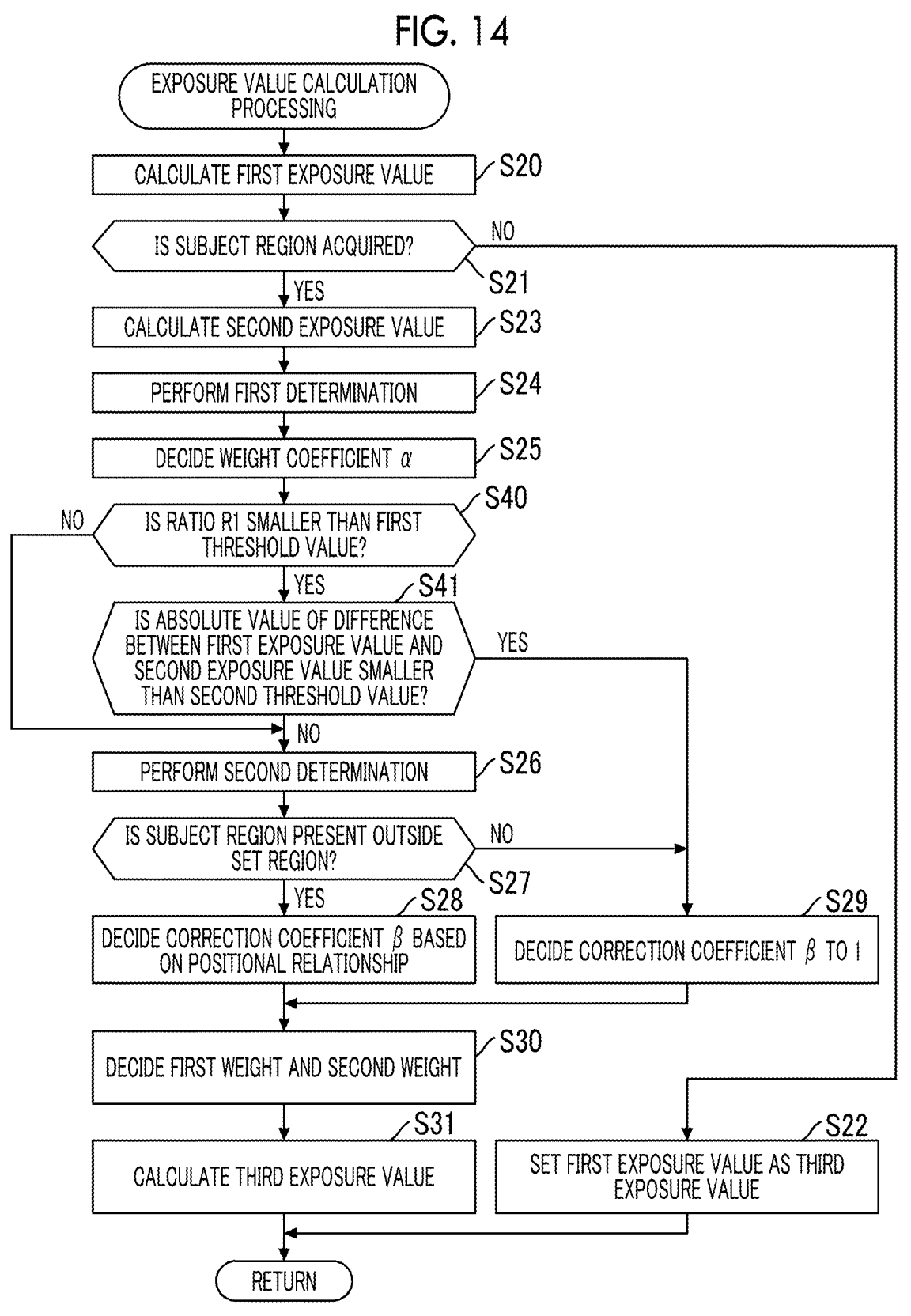

EXPOSURE VALUE CALCULATION PROCESSING

CALCULATE FIRST EXPOSURE VALUE — S20

IS SUBJECT REGION ACQUIRED? — NO — S21

YES

CALCULATE SECOND EXPOSURE VALUE — S23

PERFORM FIRST DETERMINATION — S24

DECIDE WEIGHT COEFFICIENT $\alpha$ — S25

IS RATIO R1 SMALLER THAN FIRST THRESHOLD VALUE? — S40 — NO

YES — S41

IS ABSOLUTE VALUE OF DIFFERENCE BETWEEN FIRST EXPOSURE VALUE AND SECOND EXPOSURE VALUE SMALLER THAN SECOND THRESHOLD VALUE? — YES

NO

PERFORM SECOND DETERMINATION — S26

IS SUBJECT REGION PRESENT OUTSIDE SET REGION? — NO — S27

YES — S28

DECIDE CORRECTION COEFFICIENT $\beta$ BASED ON POSITIONAL RELATIONSHIP

DECIDE CORRECTION COEFFICIENT $\beta$ TO 1 — S29

DECIDE FIRST WEIGHT AND SECOND WEIGHT — S30

CALCULATE THIRD EXPOSURE VALUE — S31

SET FIRST EXPOSURE VALUE AS THIRD EXPOSURE VALUE — S22

RETURN

1

EXPOSURE CONTROL DEVICE, IMAGING APPARATUS, EXPOSURE CONTROL METHOD, AND PROGRAM OF PREVENTING INAPPROPRIATE VARIATION IN BRIGHTNESS

CROSS-REFERENCE TO RELATED APPLICATIONS

The present application claims priority under 35 U.S.C. § 119 to Japanese Patent Application No. 2023-131336 filed on Aug. 10, 2023. The above application is hereby expressly incorporated by reference, in its entirety, into the present application.

BACKGROUND

1. Technical Field

The technology of the present disclosure relates to an exposure control device, an imaging apparatus, an exposure control method, and a program.

2. Description of the Related Art

JP2008-233470A discloses a stop control device that adjusts an aperture of a stop based on an output signal of an imaging element that photoelectrically converts incident light passing through the stop. The stop control device comprises a face detection unit that detects a face from a captured image based on the output signal of the imaging element, and adjusts the aperture based on at least one of a position of the face on the captured image, a size of the face on the captured image, or an orientation of the face on the captured image.

JP2020-072469A discloses an information processing apparatus including an image acquisition unit that acquires an image obtained by imaging a subject by using an imaging unit, a detection method setting unit that sets a detection method of the subject for the image, a subject detection unit that detects the subject based on the detection method determined by the detection method setting unit, and an exposure determination unit that determines exposure based on a detection result obtained from the subject detection unit, in which the detection method setting unit can set different detection methods for different regions in the image based on predetermined information obtained when performing imaging to obtain the image.

SUMMARY

An object of the technology of the present disclosure is to provide an exposure control device, an imaging apparatus, an exposure control method, and a program capable of preventing an inappropriate variation in brightness of a set region that is set in an image.

In order to achieve the above object, according to the present disclosure, there is provided an exposure control device comprising: a processor; and a memory, in which the processor is configured to: acquire an image signal output from an imaging element; acquire a specific subject region in an image represented by the image signal; calculate a first exposure value of a set region that is set in the image and a second exposure value of the subject region; decide a first weight for the first exposure value and a second weight for the second exposure value based on first determination of determining importance of the subject region with respect to the set region and second determination of determining a positional relationship between the set region and the subject region; and calculate a third exposure value by performing weight addition on the first exposure value and the second exposure value using the first weight and the second weight.

Preferably, the processor is configured to decide the first weight and the second weight regardless of the positional relationship in a case where it is determined in the second determination that the subject region is present in the set region.

Preferably, the processor is configured to decide the first weight and the second weight based on the positional relationship in a case where it is determined in the second determination that the subject region is present outside the set region.

Preferably, the processor is configured to: decide a weight coefficient based on a result of the first determination; and decide a correction coefficient based on a result of the second determination.

Preferably, the processor is configured to: assuming that the first exposure value is E1, the second exposure value is E2, the third exposure value is E3, the first weight is W1, the second weight is W2, the weight coefficient is $\alpha$, and the correction coefficient is $\beta$, decide the first weight and the second weight such that $W1=1-\alpha\times\beta$ and $W2=\alpha\times\beta$ are satisfied; and calculate the third exposure value based on $E3=E1\times W1+E2\times W2$.

Preferably, the processor is configured to decide the correction coefficient to 1 in a case where it is determined in the second determination that the subject region is present in the set region.

Preferably, the processor is configured to decide the correction coefficient based on the positional relationship in a case where it is determined in the second determination that the subject region is present outside the set region.

Preferably, the positional relationship includes a distance between the set region and the subject region.

Preferably, the correction coefficient decreases as the distance increases.

Preferably, the first determination is determination based on a ratio of a size of the subject region to a size of the set region.

Preferably, the processor is configured to decide the first weight and the second weight regardless of the positional relationship in a case where the ratio of the size of the subject region to the size of the set region is smaller than a first threshold value and an absolute value of a difference between the first exposure value and the second exposure value is smaller than a second threshold value.

Preferably, the processor is configured to decide the first weight and the second weight regardless of the positional relationship in a case where the ratio of the size of the subject region to the size of the set region is smaller than a first threshold value, an absolute value of a difference between the first exposure value and the second exposure value is smaller than a second threshold value, and a subject included in the subject region is a specific subject.

Preferably, the subject region is a face region of a person.

Preferably, the processor is configured to acquire the subject region by using a machine-trained model.

Preferably, the set region is an image display region for displaying an image in the set region, an image recording region for recording an image in the set region, or an image cutout region for electronic zoom or camera shake correction.

According to the present disclosure, there is provided an imaging apparatus comprising: the exposure control device; and the imaging element.

According to the present disclosure, there is provided an exposure control method comprising: via a processor, acquiring an image signal output from an imaging element; acquiring a specific subject region in an image represented by the image signal; calculating a first exposure value of a set region that is set in the image and a second exposure value of the subject region; deciding a first weight for the first exposure value and a second weight for the second exposure value based on first determination of determining importance of the subject region with respect to the set region and second determination of determining a positional relationship between the set region and the subject region; and calculating a third exposure value by performing weight addition on the first exposure value and the second exposure value using the first weight and the second weight.

According to the present disclosure, there is provided a program causing a processor to execute a process comprising: acquiring an image signal output from an imaging element; acquiring a specific subject region in an image represented by the image signal; calculating a first exposure value of a set region that is set in the image and a second exposure value of the subject region; deciding a first weight for the first exposure value and a second weight for the second exposure value based on first determination of determining importance of the subject region with respect to the set region and second determination of determining a positional relationship between the set region and the subject region; and calculating a third exposure value by performing weight addition on the first exposure value and the second exposure value using the first weight and the second weight.

BRIEF DESCRIPTION OF THE DRAWINGS

Exemplary embodiments according to the technique of the present disclosure will be described in detail based on the following figures, wherein:

FIG. 4 is a diagram illustrating an example of subject region acquisition processing, FIG. 14 is a flowchart illustrating a flow of exposure value calculation processing according to the first modification example.

DETAILED DESCRIPTION

An example of an embodiment according to the technology of the present disclosure will be described with reference to the accompanying drawings.

First, terms that are used in the following description will be described.

In the following description, "IC" is an abbreviation for "integrated circuit". "CPU" is an abbreviation for "central processing unit". "ROM" is an abbreviation for "read only memory". "RAM" is an abbreviation for "random access memory". "CMOS" is an abbreviation for "complementary metal oxide semiconductor".

"FPGA" is an abbreviation for "field programmable gate array". "PLD" is an abbreviation for "programmable logic device". "ASIC" is an abbreviation for "application specific integrated circuit". "OVF" is an abbreviation for "optical view finder". "EVF" is an abbreviation for "electronic view finder". "CNN" is an abbreviation for "convolutional neural network".

As one embodiment of an imaging apparatus, the technology of the present disclosure will be described by using a lens-interchangeable digital camera as an example. Note that the technology of the present disclosure is not limited to the lens-interchangeable type and can also be applied to a lens-integrated digital camera.

Figure 1:
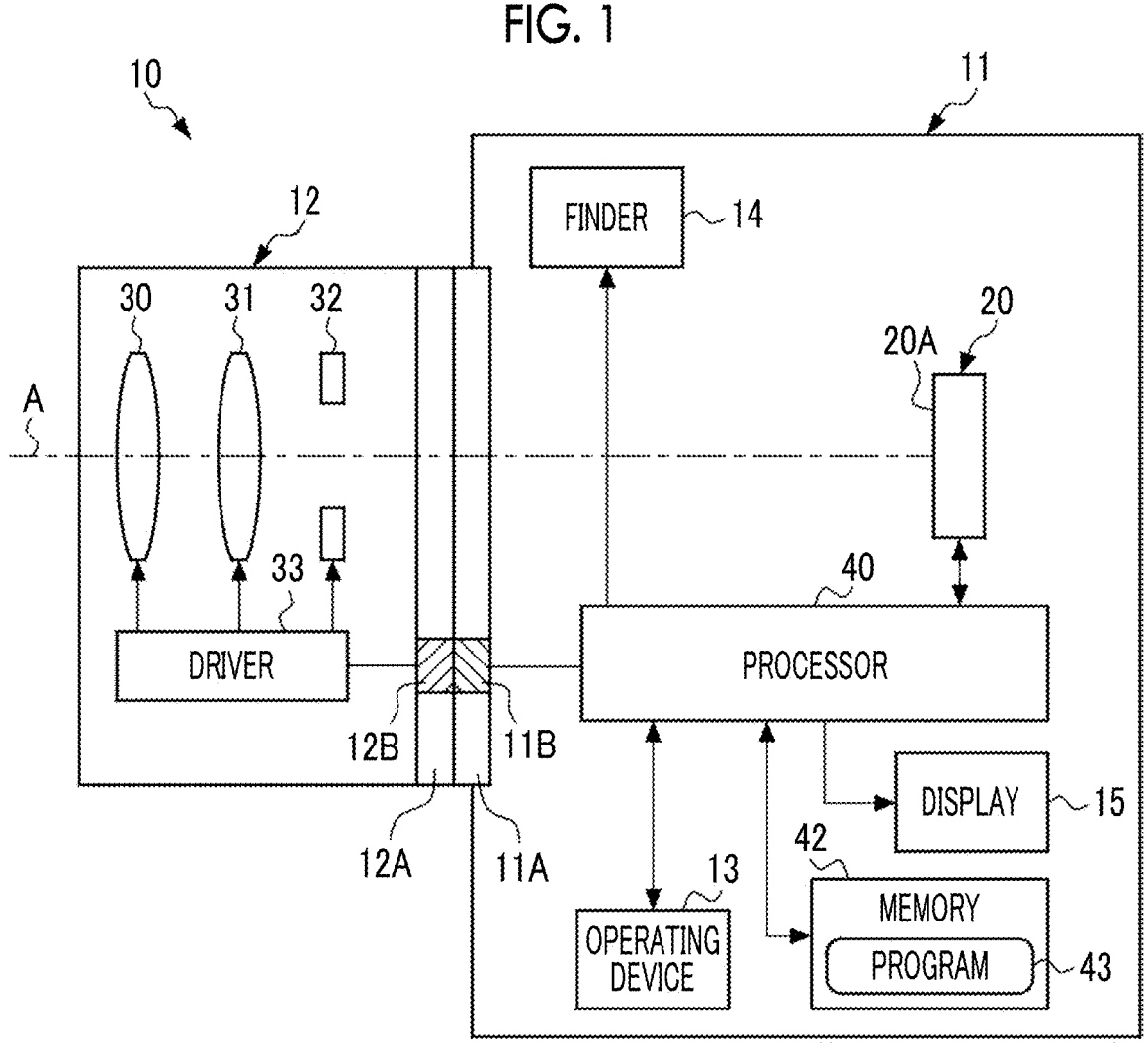
FIG. 1 is a diagram illustrating an example of an internal configuration of an imaging apparatus.

FIG. 1 illustrates an example of a configuration of an imaging apparatus 10. The imaging apparatus 10 is a lens-interchangeable digital camera. The imaging apparatus 10 includes a body 11 and an imaging lens 12 interchangeably mounted on the body 11. The imaging lens 12 is attached to a front surface side of the body 11 via a camera side mount 11A and a lens side mount 12A.

The body 11 is provided with an operating device 13 that includes a dial, a release button, a touch panel, and the like and receives an operation by a user. Examples of an operation mode of the imaging apparatus 10 include a still image capturing mode, a video capturing mode, and an image display mode. The operating device 13 is operated by the user in a case of setting the operation mode. In addition, the operating device 13 is operated by the user in a case of starting an execution of still image capturing or video capturing.

Further, the body 11 is provided with a finder 14. Here, the finder 14 is a hybrid finder (registered trademark). The hybrid finder refers to, for example, a finder in which an optical view finder (hereinafter, referred to as "OVF") and an electronic view finder (hereinafter, referred to as "EVF") are selectively used. The user can observe an optical image or a live view image of a subject projected onto the finder 14 via a finder eyepiece portion (not illustrated).

In addition, a display 15 is provided on a rear surface side of the body 11. The display 15 displays an image based on an image signal obtained through imaging, various menu screens, and the like. The user can also observe the live view image projected onto the display 15 instead of the finder 14.

The body 11 and the imaging lens 12 are electrically connected to each other through contact between an electrical contact 11B provided on the camera side mount 11A and an electrical contact 12B provided on the lens side mount 12A.

The imaging lens 12 includes a zoom lens 30, a focus lens 31, a stop 32, and a driver 33. The zoom lens 30, the focus lens 31, and the stop 32 are disposed in this order from the subject side along the optical axis A. The zoom lens 30 and the focus lens 31 can be moved in a direction of the optical axis A. The zoom lens 30, the focus lens 31, and the stop 32 constitute an imaging optical system. The type, number, and arrangement order of the lenses constituting the imaging optical system are not limited to the example illustrated in FIG. 1.

In addition, the imaging lens 12 includes a driver 33. The driver 33 is configured with, for example, a CPU, a RAM, a ROM, and the like. The lens driving controller 34 is electrically connected to a processor 40 inside the body 11 via the electrical contact 12B and the electrical contact 11B.

The driver 33 drives the zoom lens 30, the focus lens 31, and the stop 32 based on the control signal transmitted from the processor 40. The driver 33 drives the zoom lens 30 based on a control signal for zoom magnification control that is transmitted from the processor 40 in order to control a zoom magnification. In addition, the driver 33 drives the focus lens 31 based on a control signal for focus control that is transmitted from the processor 40 in order to adjust a focusing position of the imaging lens 12.

The stop 32 has an opening in which an opening diameter is variable with the optical axis A as a center. The driver 33 drives the stop 32 based on a control signal for stop adjustment that is transmitted from the processor 40 in order to adjust an amount of light incident on the light-receiving surface 20A of the imaging sensor 20. A value representing an opening diameter (that is, an aperture) of the stop 32 is referred to as an "F number".

Further, the imaging sensor 20, the processor 40, and a memory 42 are provided inside the body 11. The operations of the imaging sensor 20, the memory 42, the operating device 13, the finder 14, and the display 15 are controlled by the processor 40.

The processor 40 is configured by, for example, a CPU. In this case, the processor 40 executes various types of processing based on a program 43 stored in the memory 42. Note that the processor 40 may be configured by an assembly of a plurality of IC chips. Note that the processor 40 and the memory 42 constitute an "exposure control device" according to the technology of the present disclosure.

The imaging sensor 20 is, for example, a CMOS-type image sensor. The imaging sensor 20 is disposed such that the optical axis A is orthogonal to the light-receiving surface 20A and the optical axis A is located at the center of the light-receiving surface 20A. Light passing through the imaging lens 12 is incident on the light-receiving surface 20A. A plurality of pixels for generating signals through photoelectric conversion are formed on the light-receiving surface 20A. The imaging sensor 20 generates and outputs an image signal D by photoelectrically converting the light incident on each pixel. Note that the imaging sensor 20 is an example of an "imaging element" according to the technology of the present disclosure.

In addition, a color filter array of a Bayer array is disposed on the light-receiving surface of the imaging sensor 20, and a color filter of any one of red (R), green (G), or blue (B) is disposed to face each pixel. Note that some of the plurality of pixels arranged on the light-receiving surface of the imaging sensor 20 may be phase difference detection pixels for detecting a phase difference related to focus control.

In addition, the imaging sensor 20 has an electronic shutter function, and can electronically change a shutter speed. The shutter speed is controlled by the processor 40.

Figures 2, 3:
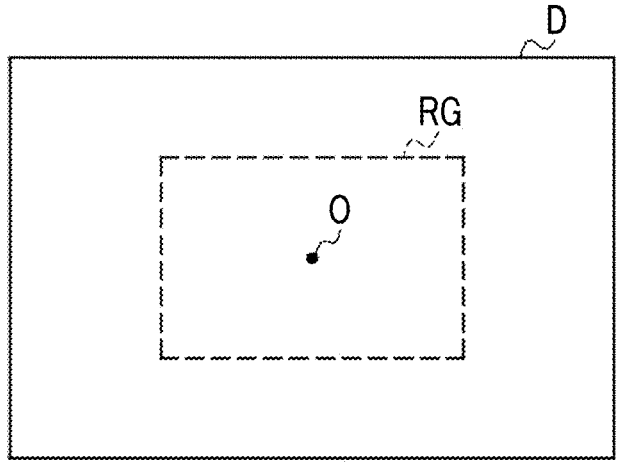
FIG. 2 is a block diagram Illustrating an example of a functional configuration of a processor.
FIG. 3 is a diagram illustrating an example of a set region.

FIG. 2 illustrates an example of a functional configuration of the processor 40. For example, the processor 40 implements various functional units by executing processing according to the program 43 stored in the memory 42. As illustrated in FIG. 2, for example, the processor 40 realizes a main controller 50, an imaging controller 51, an image acquisition unit 52, a display controller 53, a region decision unit 54, a subject region acquisition unit 55, and an exposure value calculation unit 56.

The main controller 50 comprehensively controls the operation of the imaging apparatus 10 based on output information from the operating device 13. The imaging controller 51 executes imaging processing of causing the imaging sensor 20 to perform an imaging operation by controlling the imaging sensor 20. The imaging controller 51 drives the imaging sensor 20 in the still image capturing mode or the video capturing mode.

The imaging sensor 20 outputs the image signal D obtained through imaging. For example, the image signal D is a signal for one frame. The imaging sensor 20 outputs the image signal D for each frame period.

The image acquisition unit 52 acquires the image signal D output from the imaging sensor 20, and outputs the acquired image signal D to the display controller 53, the subject region acquisition unit 55, the exposure value calculation unit 56, and the like. The image acquisition unit 52 performs image processing such as demosaicing on the acquired image signal D, and then outputs the processed image signal D.

The region decision unit 54 decides a set region RG based on the output information from the operating device 13, and sets the set region RG in the image represented by the image signal D. In the present embodiment, the set region RG is an image display region for displaying an image in the set region RG on the display 15 or the finder 14. In the images represented by the image signals D, only the image in the set region RG is displayed on the display 15. A size or a shape of the set region RG is designated by an operation of the operating device 13 by the user. Note that the region decision unit 54 may set the size or the shape of the set region RG based on a size or the like of a recorded image designated by an operation of the operating device 13. The region decision unit 54 supplies information indicating the set region RG to the display controller 53 and the exposure value calculation unit 56.

The display controller 53 displays the image in the set region RG on the display 15 based on the image signal D and the set region RG. In addition, the display controller 53 causes the display 15 to perform live view image display based on the image signal D that is periodically input from the image acquisition unit 52 during an imaging preparation operation before the still image capturing or the video capturing.

The subject region acquisition unit 55 acquires, from the entire image represented by the image signal D, a subject region RO including a subject to be acquired. The user can designate a subject (a face of a person, a bird, an airplane, a car, or the like) to be acquired by using the operating device 13. In addition, the user can designate a plurality of types of subjects to be acquired. The subject region acquisition unit 55 supplies information representing the subject region RO to the exposure value calculation unit 56. The entire image represented by the image signal D refers to the entire image represented by a signal output from an effective region of the imaging sensor 20 on which light is incident, and a signal output from an optical black region or the like is excluded. The subject region RO including the subject to be acquired is an example of a "specific subject region" according to the technology of the present disclosure. The specific subject region refers to a region including a subject that is optionally selected by an engineer or a user.

The exposure value calculation unit 56 performs exposure value calculation processing based on the image signal D and information indicating the set region RG and the subject region RO. Although described in detail below, the exposure value calculation unit 56 calculates a first exposure value E1 of the set region RG and a second exposure value E2 of the subject region RO, and calculates a third exposure value E3 as a final exposure value by performing weight addition of the first exposure value E1 and the second exposure value E2. The exposure value calculation unit 56 outputs the calculated third exposure value E3 to the main controller 50. Note that the exposure value is a value determined by the amount of light incident on the light-receiving surface 20A of the imaging sensor 20 in the exposure period and is controlled by the F number and the shutter speed (exposure time). The exposure value is also referred to as an EV value. The first exposure value E1 represents brightness of the set region RG. The second exposure value E2 represents brightness of the subject region RO.

The main controller 50 performs exposure control of controlling the opening diameter of the stop 32 and the shutter speed of the imaging sensor 20 based on the third exposure value E3. In a case of performing the exposure control, the main controller 50 decides a combination of the F number and the shutter speed at which the third exposure value E3 is obtained, using the program line diagram.

Note that, although not illustrated in FIG. 2, the processor 40 is configured to have a function of calculating a defocus amount based on the signal output from the phase difference detection pixels of the imaging sensor 20. The main controller 50 adjusts the focusing position by controlling the focus lens 31 based on the calculated defocus amount.

FIG. 3 illustrates an example of the set region RG. The image represented by the image signal D has a rectangular shape. For example, the set region RG has a rectangular shape, and a centroid O of the set region RG matches with a centroid of the image represented by the image signal D. The set region RG may have the same aspect ratio as the aspect ratio of the image represented by the image signal D. In the present embodiment, the set region RG is a display region, and the size or the aspect ratio of the set region RG is changed based on the size or the like of the recorded image.

Figure 4:
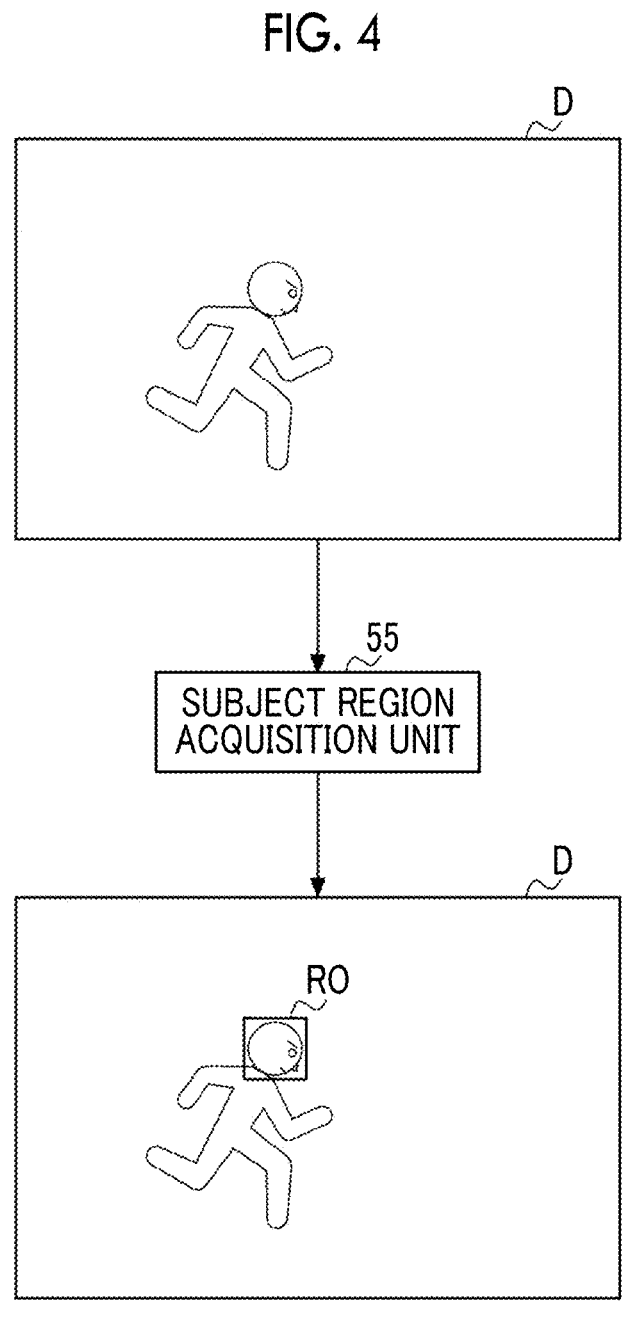

FIG. 4 illustrates an example of subject region acquisition processing by the subject region acquisition unit 55. In the present embodiment, the subject region acquisition unit 55 acquires the subject region RO including a subject to be acquired by using a known template matching method. Specifically, the subject region acquisition unit 55 performs search using a rectangular template image according to the subject to be acquired, and acquires, as the subject region RO, a region having the highest rate of match with the template image from the entire image represented by the image signal D. FIG. 4 illustrates a case where the subject region RO is a face region of a person. In the present embodiment, the subject region RO is represented by a rectangular frame.

Figure 5:
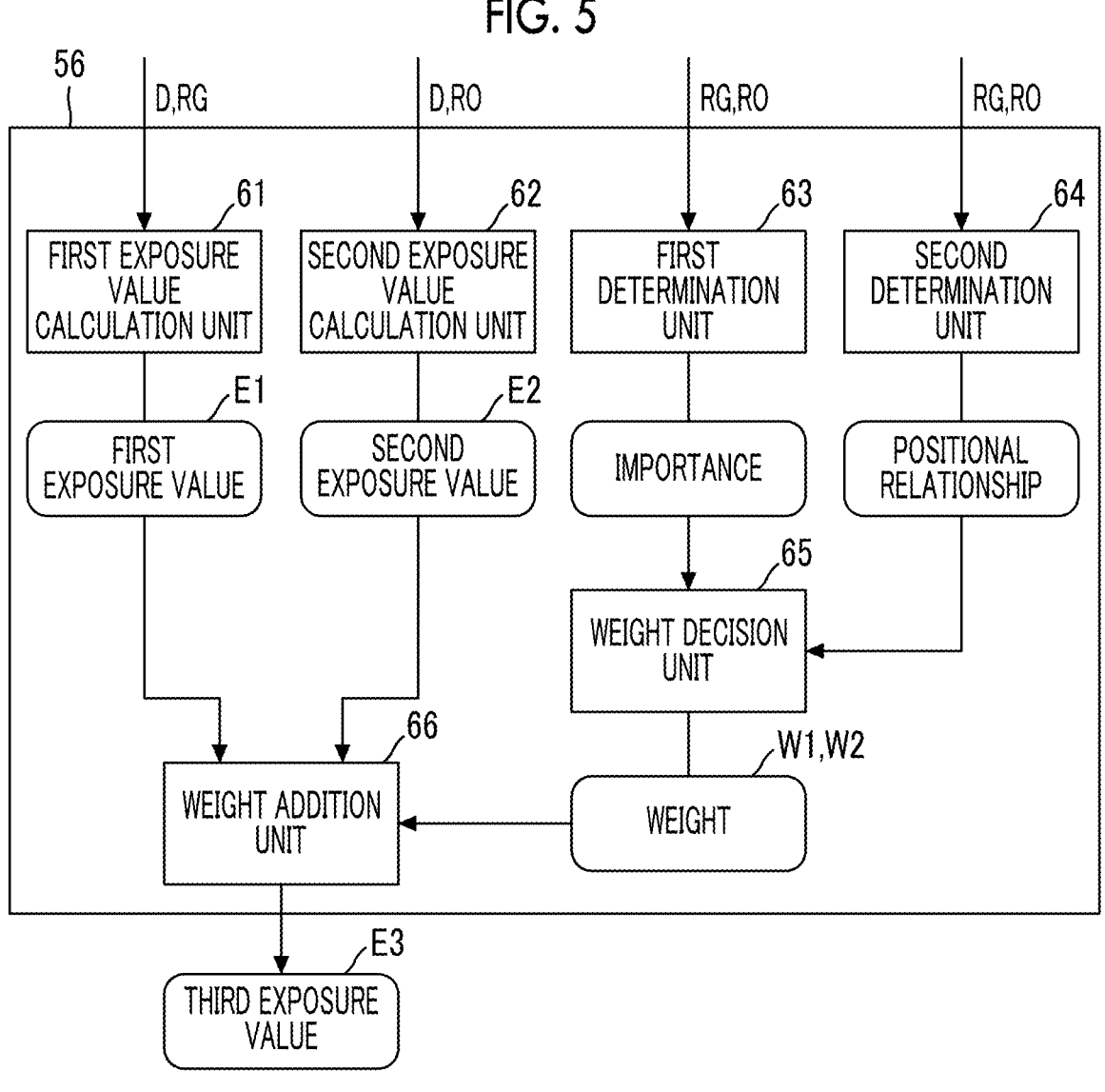
FIG. 5 is a diagram illustrating a configuration example of an exposure value calculation unit.
Figure 6:
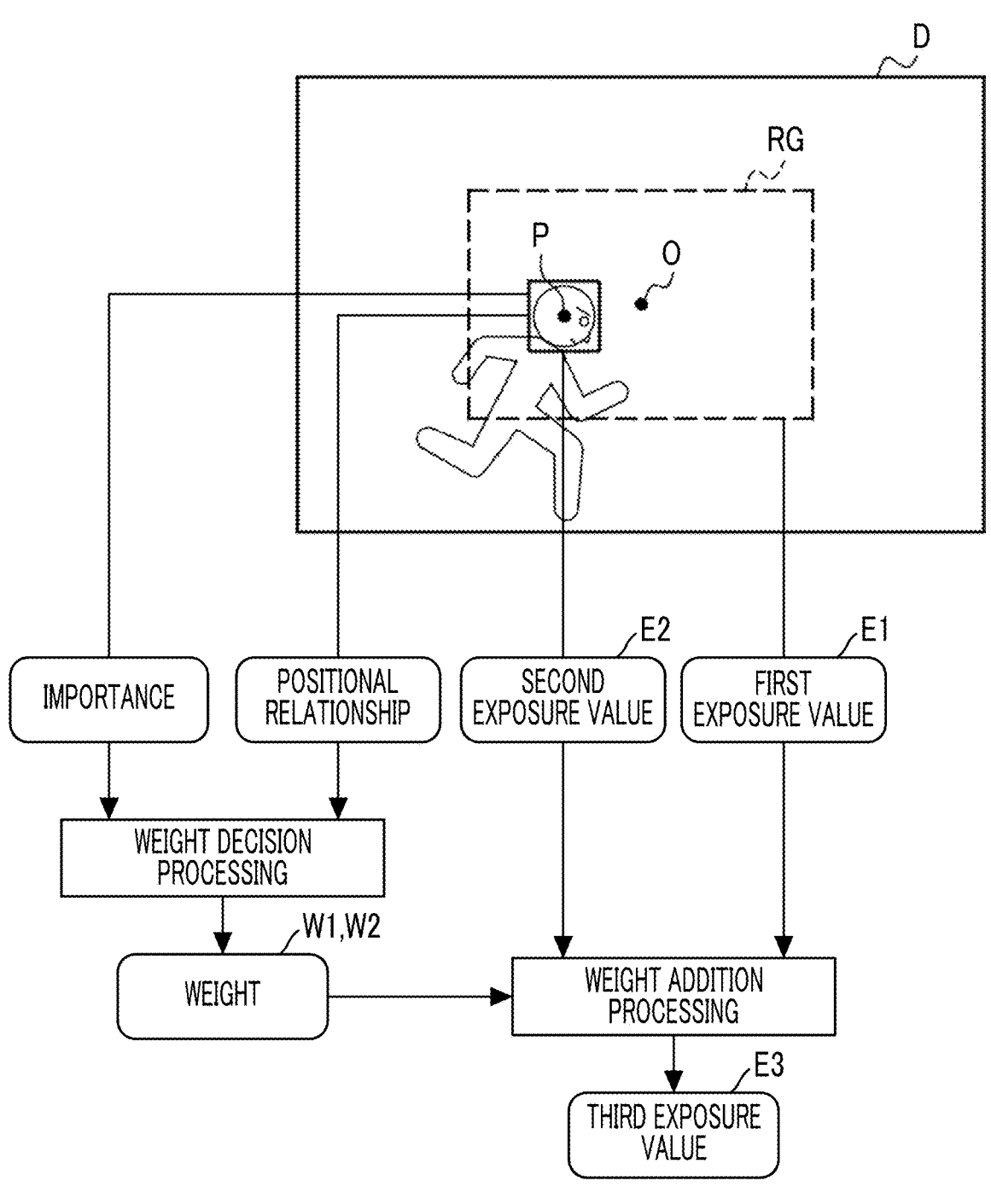
FIG. 6 is a diagram conceptually illustrating exposure value calculation processing.

FIG. 5 illustrates a configuration example of the exposure value calculation unit 56. FIG. 6 conceptually illustrates exposure value calculation processing by the exposure value calculation unit 56. The exposure value calculation unit 56 includes a first exposure value calculation unit 61, a second exposure value calculation unit 62, a first determination unit 63, a second determination unit 64, a weight decision unit 65, and a weight addition unit 66.

The first exposure value calculation unit 61 performs photometry on the set region RG in the image represented by the image signal D, and calculates the first exposure value E1 based on the obtained photometry value. The second exposure value calculation unit 62 performs photometry on the subject region RO in the image represented by the image signal D, and calculates the second exposure value E2 based on the obtained photometry value. For example, the first exposure value calculation unit 61 and the second exposure value calculation unit 62 perform multi-divisional photometry.

The first determination unit 63 performs first determination of determining importance of the subject region RO with respect to the set region RG. In the present embodiment, the importance is a ratio R1 of the size of the subject region RO to the size of the set region RG. More specifically, the ratio R1 is a ratio of the area of the subject region RO to the area of the set region RG. The importance is higher as the ratio R1 increases.

The second determination unit 64 performs second determination of determining a positional relationship between the set region RG and the subject region RO. In the present embodiment, the second determination unit 64 determines whether or not the subject region RO is present in the set region RG. For example, the second determination unit 64 obtains a centroid P of the subject region RO, and determines whether or not the centroid P is present in the set region RG Hereinafter, "the subject region RO is present in the set region RG" refers to "the centroid P of the subject region RO is present in the set region RG", and "the subject region RO is present outside the set region RG" refers to "the centroid P of the subject region RO is present outside the set region RG".

In a case where the subject region RO is present outside the set region RG, the second determination unit 64 calculates a ratio R2 of a distance from the centroid O of the set region RG to the centroid P of the subject region RO to a distance from an outer periphery of the set region RG to the centroid P of the subject region RO.

Figure 7:
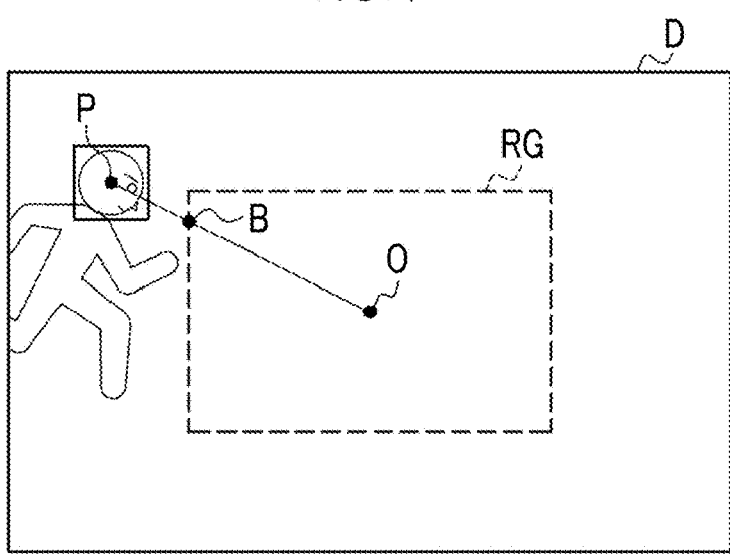
FIG. 7 is a diagram illustrating an example of a case where a subject region is present outside a set region.

FIG. 7 illustrates an example of a case where the subject region RO is present outside the set region RG. In FIG. 7, B indicates an intersection between a straight line connecting the centroid O and the centroid P and the outer periphery of the set region RG. In this case, the second determination unit 64 calculates a ratio R2 of the distance from the centroid O to the intersection B to the distance from the centroid O to the centroid P. In a case where the subject region RO is present outside the set region RG, R2<1.

Figure 8:
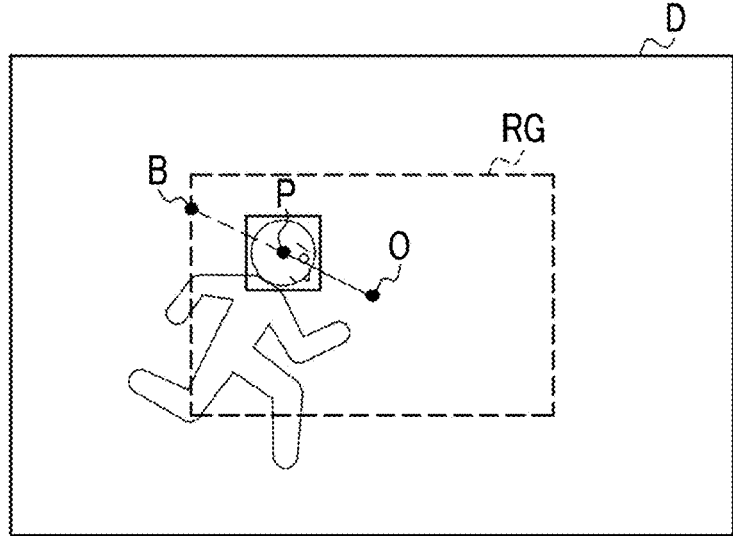
FIG. 8 is a diagram illustrating an example of a case where a subject region is present in a set region.

FIG. 8 illustrates an example of a case where the subject region RO is present in the set region RG. In FIG. 8, B indicates an intersection between an extension line extending the straight line connecting the centroid O and the centroid P and the outer periphery of the set region RG. In this case, the second determination unit 64 calculates a ratio R2 of the distance from the centroid O to the intersection B to the distance from the centroid O to the centroid P. In a case where the subject region RO is present in the set region RG, $R2 \geq 1$.

The weight decision unit 65 decides a first weight W1 for the first exposure value E1 and a second weight W2 for the second exposure value E2 based on a result of the first determination by the first determination unit 63 and a result of the second determination by the second determination unit 64. Specifically, the weight decision unit 65 decides a weight coefficient α based on the result of the first determination, and decides a correction coefficient β based on the result of the second determination. Then, the weight decision unit 65 decides the first weight W1 and the second weight W2 such that Expression (1) and Expression (2) are satisfied.

$$W1 = 1 - \alpha \times \beta \qquad (1)$$

$$W2 = \alpha \times \beta \qquad (2)$$

Here, the weight coefficient α is a coefficient representing the importance of the subject region RO with respect to the set region RG obtained by the first determination. The correction coefficient β is a coefficient representing the positional relationship between the set region RG and the subject region RO that is obtained by the second determination. In the present embodiment, the weight coefficient α is a coefficient depending on the above-described ratio R1. The correction coefficient β is a coefficient depending on the above-described ratio R2.

Figure 9:
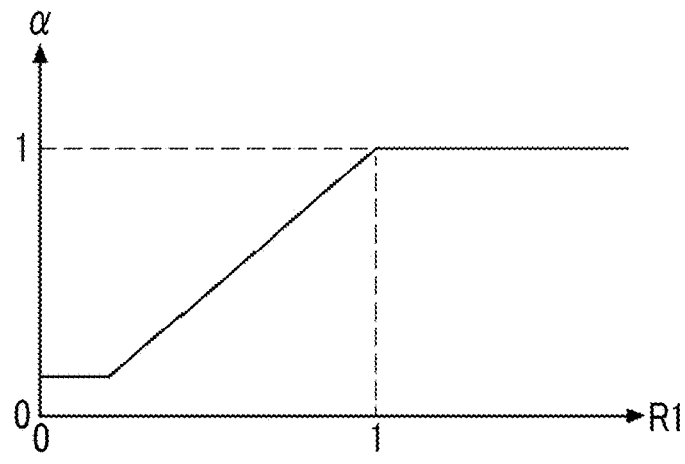
FIG. 9 is a diagram illustrating an example of a relationship between a weight coefficient and a ratio.

FIG. 9 illustrates an example of a relationship between the weight coefficient α and the ratio R1. The relationship between the weight coefficient α and the ratio R1 is defined in advance, and is stored in the memory 42, for example, as data. In the relationship illustrated in FIG. 9, α=1 in a case where R1≥1, and the weight coefficient α decreases as the ratio R1 decreases in a case where R1<1.

The weight decision unit 65 decides the weight coefficient α based on the ratio R1 obtained by the first determination by the first determination unit 63 and data representing the relationship between the weight coefficient α and the ratio R1. In a case where the size of the subject region RO is equal to or larger than the size of the set region RG, the weight coefficient α is set to a fixed value (in the example illustrated in FIG. 9, "1"). On the other hand, in a case where the size of the subject region RO is smaller than the size of the set region RG, the weight coefficient α decreases as the size of the subject region RO decreases. That is, the weight coefficient α monotonically increases as the ratio R1 increases.

Note that, in a range of $0 \leq R1 < 1$, a relationship between the weight coefficient α and the ratio R1 may be linear. In addition, in the range of $0 \leq R1 < 1$, a relationship between the weight coefficient α and the ratio R1 may be non-linear.

Figures 10, 11:
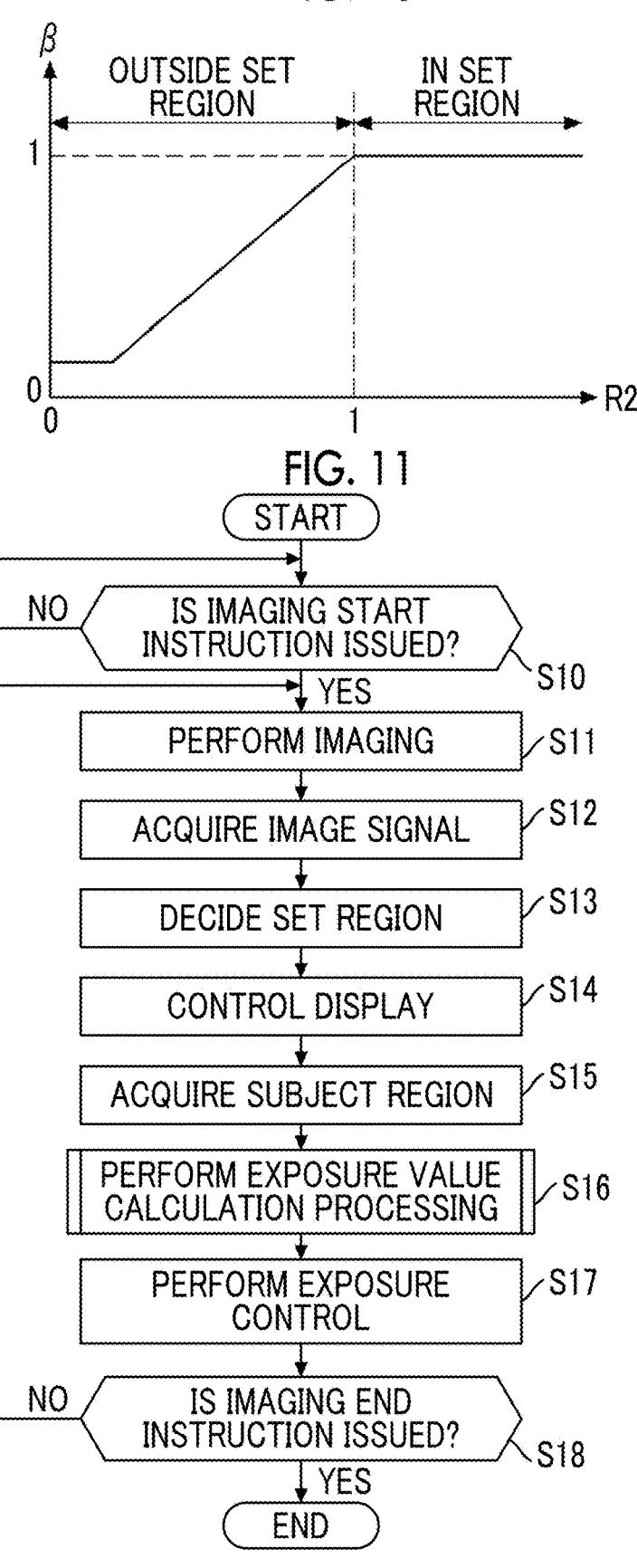
FIG. 10 is a diagram illustrating an example of a relationship between a correction coefficient and a ratio.
FIG. 11 is a flowchart illustrating a flow of overall processing executed by the imaging apparatus.

FIG. 10 illustrates an example of a relationship between the correction coefficient β and the ratio R2. The relationship between the correction coefficient β and the ratio R2 is defined in advance, and is stored in the memory 42, for example, as data. In the relationship illustrated in FIG. 10, R=1 in a case where R2≥1, and the correction coefficient β decreases as the ratio R2 decreases in a case where R2<1.

The weight decision unit 65 decides the correction coefficient β based on the ratio R2 obtained by the second determination by the second determination unit 64 and the data representing the relationship between the correction coefficient β and the ratio R2. In a case where the subject region RO is present in the set region RG, the correction coefficient β is set to a fixed value (in the example illustrated in FIG. 10, "1"). On the other hand, in a case where the subject region RO is present outside the set region RG, the correction coefficient R decreases as the distance between the subject region RO and the set region RG (for example, the distance between the centroid O and the centroid P) increases. That is, the correction coefficient β monotonically increases as the ratio R2 increases.

In a range of $0 \leq R2 < 1$, a relationship between the correction coefficient β and the ratio R2 may be linear. In the range of $0 \leq R2 < 1$, a relationship between the correction coefficient β and the ratio R2 may be non-linear. In addition, in the range of $0 \leq R2 < 1$, the correction coefficient β may be set to a fixed value (for example, "0").

As described above, in a case where it is determined in the second determination that the subject region RO is present in the set region RG, the weight decision unit 65 decides the correction coefficient β to 1. That is, in a case where it is determined in the second determination that the subject region RO is present in the set region RG, the weight decision unit 65 decides the first weight W1 and the second weight W2 regardless of the positional relationship between the set region RG and the subject region RO.

On the other hand, in a case where it is determined in the second determination that the subject region RO is present outside the set region RG, the weight decision unit 65 decides the correction coefficient β based on the positional relationship between the set region RG and the subject region RO. That is, in a case where it is determined in the second determination that the subject region RO is present outside the set region RG, the weight decision unit 65 decides the first weight W1 and the second weight W2 based on the positional relationship between the set region RG and the subject region RO.

The weight addition unit 66 calculates the third exposure value E3 by performing weight addition on the first exposure value E1 and the second exposure value E2 using the first weight W1 and the second weight W2. Specifically, the weight addition unit 66 calculates the third exposure value E3 by using a relational expression represented by Expression (3). Here, a relationship of $0 \leq W1 \leq 1$ and $0 \leq W2 \leq 1$ is satisfied.

$$E3 = E1 \times W1 + E2 \times W2 \qquad (3)$$

FIG. 11 illustrates a flow of the overall processing executed by the imaging apparatus 10. FIG. 11 illustrates an example of a flow of processing in the video capturing mode.

First, the main controller 50 determines whether or not an imaging start instruction is issued by the user through an operation of the operating device 13 (step S10). In a case where an imaging start instruction is issued (YES in step S10), the main controller 50 controls the imaging controller 51 to cause the imaging sensor 20 to perform an imaging operation (step S11).

The image acquisition unit 52 acquires the image signal D for one frame that is output from the imaging sensor 20 (step S12). The region decision unit 54 decides the set region RG based on the output information from the operating device 13, and sets the set region RG in the image represented by the image signal D (step S13). The display controller 53 displays the image in the set region RG among the images represented by the image signals D on the display 15 (step S14).

The subject region acquisition unit 55 acquires the subject region RO including a subject to be acquired, from the image represented by the image signal D (step S15). The exposure value calculation unit 56 performs exposure value calculation processing based on the image signal D and the information indicating the set region RG and the subject region RO (step S16). The main controller 50 performs exposure control based on the third exposure value E3 calculated by the exposure value calculation processing (step S17).

Figure 12:
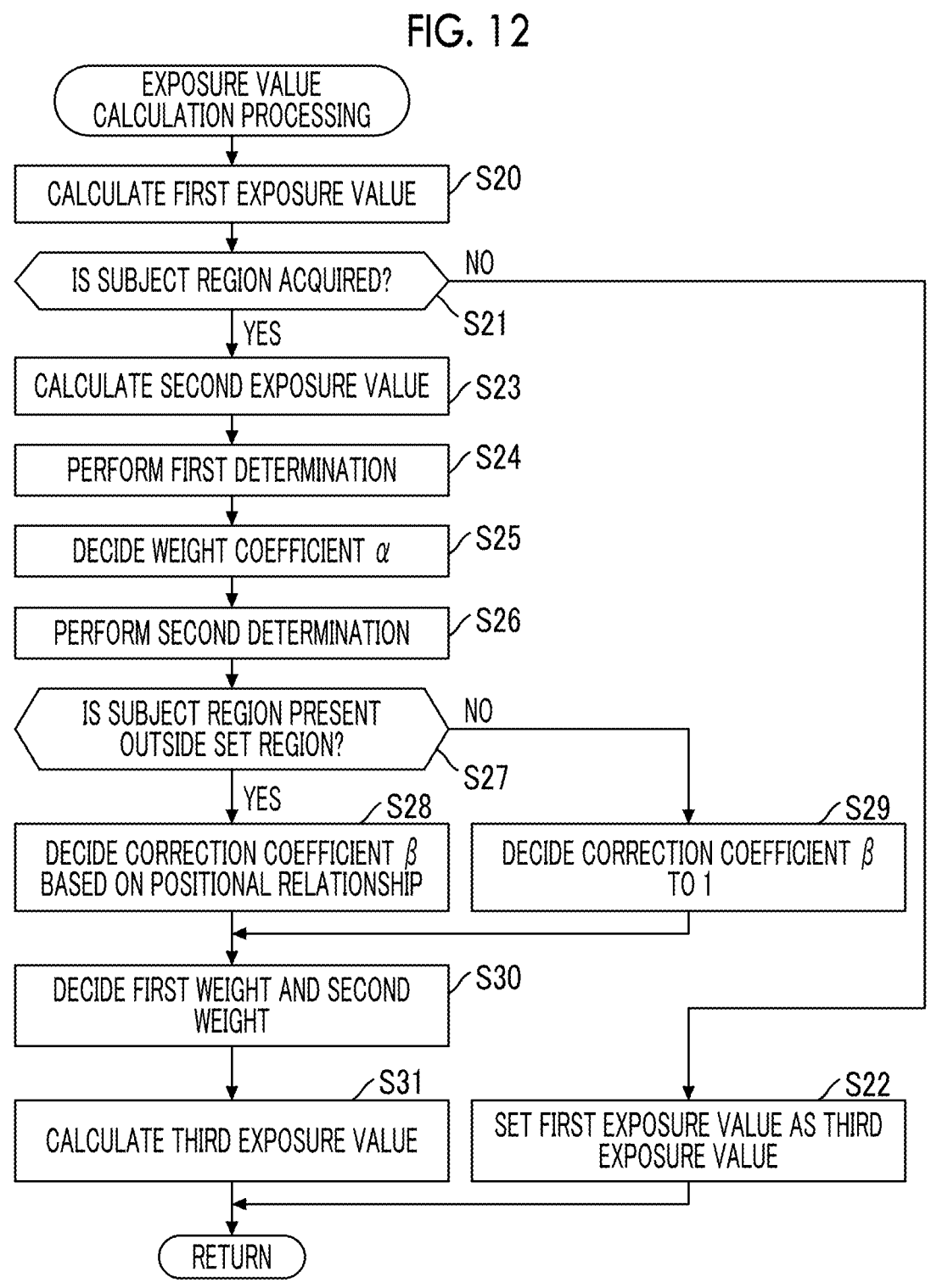
FIG. 12 is a flowchart illustrating an example of a flow of exposure value calculation processing.

FIG. 12 illustrates an example of a flow of the exposure value calculation processing. First, the first exposure value calculation unit 61 calculates the first exposure value E1 as described above (step S20). Next, the exposure value calculation unit 56 determines whether or not the subject region RO is acquired by the subject region acquisition unit 55 (step S21). In a case where the subject region RO is not acquired (NO in step S21), the exposure value calculation unit 56 sets the first exposure value E1 calculated in step S20 as the third exposure value E3 (step S22), and ends the exposure value calculation processing.

On the other hand, in a case where the subject region RO is acquired (YES in step S21), the second exposure value calculation unit 62 calculates the second exposure value E2 as described above (step S23). Next, the first determination unit 63 performs the first determination described above (step S24). The weight decision unit 65 decides the weight coefficient α based on a result of the first determination as described above (step S25). For example, processing of step S25 is performed by applying the ratio R1 obtained in the first determination to the relationship between the weight coefficient α and the ratio R1 (refer to FIG. 9).

Next, the second determination unit 64 performs the second determination described above (step S26). The weight decision unit 65 determines whether or not the subject region RO is present outside the set region RG based on a result of the second determination (step S27). In a case where the subject region RO is present outside the set region RG (YES in step S27), the weight decision unit 65 decides the correction coefficient β based on the positional relationship between the set region RG and the subject region RO as described above (step S28). On the other hand, in a case where the subject region RO is present in the set region RG (NO in step S27), the weight decision unit 65 decides the correction coefficient β to 1 (step S29). For example, processing of step S27 to step S29 is performed by applying the ratio R2 obtained in the second determination to the relationship between the correction coefficient β and the ratio R2 (refer to FIG. 10).

After step S28 or step S29, the weight decision unit 65 decides the first weight W1 and the second weight W2 based on the decided weight coefficient α and the decided correction coefficient β and Expression (1) and Expression (2) (step S30). In addition, the weight addition unit 66 calculates the third exposure value E3 based on the decided first weight W1 and the decided second weight W2 and Expression (3) (step S31). Through the above processes, the exposure value calculation processing is ended.

As described above, in the technology of the present disclosure, by deciding the first weight W1 for the first exposure value E1 of the set region RG and the second weight W2 for the second exposure value E2 of the subject region RO based on the first determination of determining the importance of the subject region RO with respect to the set region RG and the second determination of determining the positional relationship between the set region RG and the subject region RO, and performing weight addition on the first exposure value E1 and the second exposure value E2 using the first weight W1 and the second weight W2, the third exposure value E3 is calculated.

In the technology of the related art, since the positional relationship between the set region RG and the subject region RO is not considered in a case of calculating the third exposure value E3 which is a final exposure value, the third exposure value E3 does not depend on whether or not the subject region RO is present in the set region RG. For this reason, even in a case where the subject region RO is not present in the set region RG, the third exposure value E3 is influenced by the second exposure value E2 of the subject region RO. For example, when displaying the image of the set region RG, even in a case where the subject region RO, such as a person, is not present in the set region RG and a scene in the set region RG does not change, the brightness of the image to be displayed may change due to the influence of the subject region RO in a case where the subject region RO is present outside the set region RG as illustrated in FIG. 7. That is, in the technology of the related art, the presence of the subject region RO outside the set region RG may cause an inappropriate variation in brightness of the set region RG.

According to the technology of the present disclosure, the third exposure value E3 is calculated in consideration of the positional relationship between the set region RG and the subject region RO, and thus it is possible to prevent an inappropriate variation in brightness of the set region RG.

Hereinafter, various modification examples of the above-described embodiment will be described.

First Modification Example

In the embodiment described above, the weight decision unit 65 decides the first weight W1 and the second weight W2 based on the result of the first determination and the result of the second determination. On the other hand, the weight decision unit 65 may decide the first weight W1 and the second weight W2 in consideration of the first exposure value E1 and the second exposure value E2.

Figure 13:
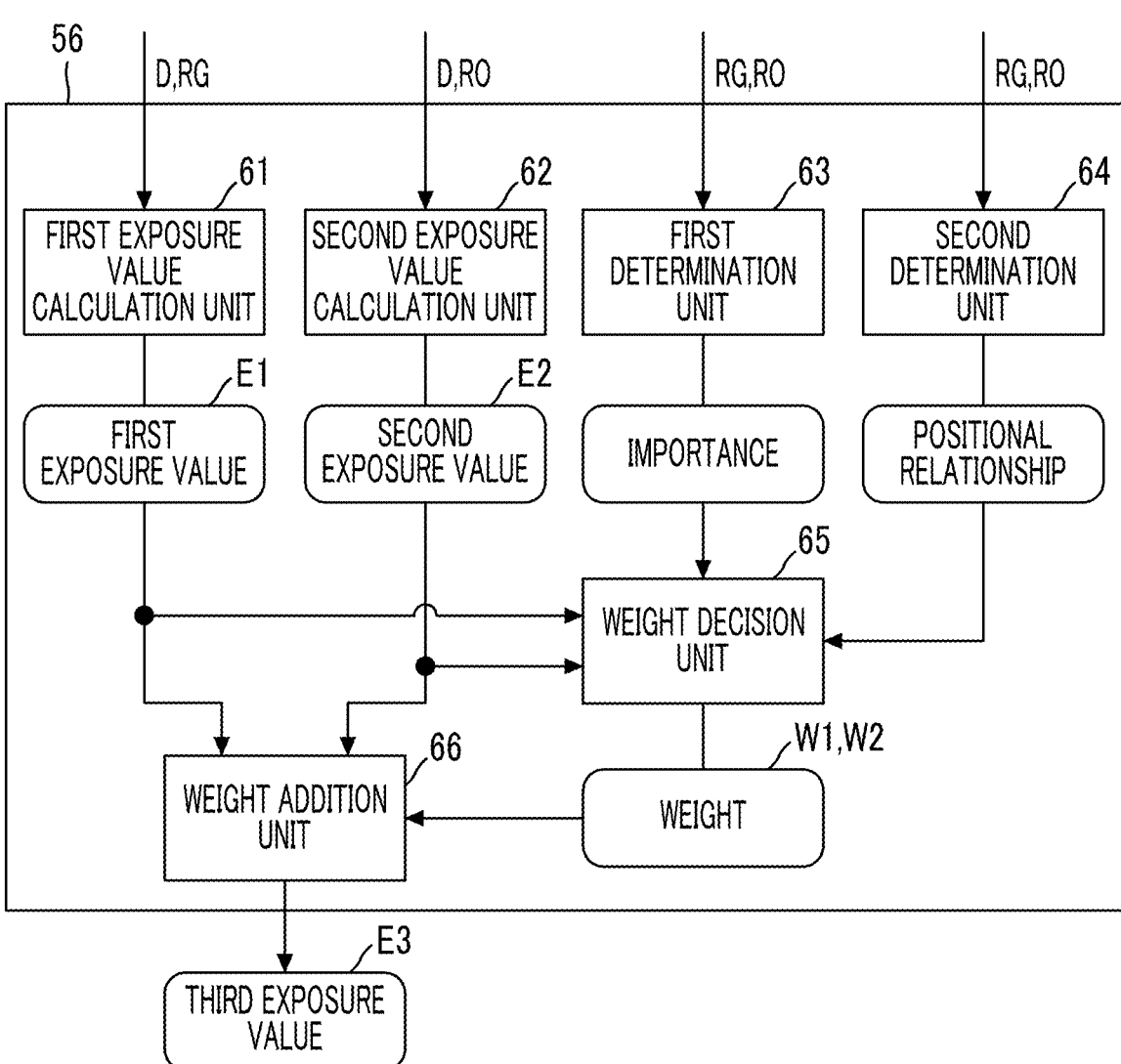
FIG. 13 is a diagram illustrating a configuration of an exposure value calculation unit according to a first modification example.

FIG. 13 illustrates a configuration of an exposure value calculation unit 56 according to a first modification example. As illustrated in FIG. 13, in the present modification example, the weight decision unit 65 decides the first weight W1 and the second weight W2 using the first exposure value E1 and the second exposure value E2 in addition to the result of the first determination and the result of the second determination. The other configurations of the exposure value calculation unit 56 according to the present modification example are the same as those of the above-described embodiment.

FIG. 14 illustrates a flow of exposure value calculation processing according to the first modification example. The exposure value calculation processing according to the present modification example is different from the exposure value calculation processing according to the above-described embodiment illustrated in FIG. 12 in that step S40 and step S41 are added between step S25 and step S26.

After the weight coefficient α is decided in step S25, the weight decision unit 65 determines whether or not the ratio R1 obtained in the first determination is smaller than a first threshold value (step S40). A fact that the ratio R1 is smaller than the first threshold value means that the size of the subject region RO is small with respect to the size of the set region RG and the importance of the subject region RO is low. That is, in step S40, it is determined whether or not the importance of the subject region RO is lower than a certain value.

In a case where the ratio R1 is not smaller than the first threshold value (NO in step S40), the weight decision unit 65 proceeds to processing of step S26. That is, in a case where the importance of the subject region RO is high, the same processing as in the embodiment described above is performed.

On the other hand, in a case where the ratio R1 is smaller than the first threshold value (YES in step S40), the weight decision unit 65 determines whether or not an absolute value of a difference between the first exposure value E1 and the second exposure value E2 is smaller than a second threshold value (step S41). A fact that the absolute value is smaller than the second threshold value means that a difference in brightness between the subject region RO and the background is small. That is, in step S41, it is determined whether or not the difference in brightness between the subject region RO and the background is smaller than a certain value.

In a case where the absolute value is not smaller than the second threshold value (NO in step S41), the weight decision unit 65 proceeds to processing of step S26. That is, even in a case where the importance of the subject region RO is low, the same processing as in the embodiment is performed in a case where the difference in brightness from the background is large.

On the other hand, in a case where the absolute value is smaller than the second threshold value (YES in step S41), the weight decision unit 65 proceeds to processing of step S29 and decides the correction coefficient β to 1. That is, in a case where the importance of the subject region RO is low and the difference in brightness from the background is small, the correction coefficient β is decided to 1 regardless of the positional relationship between the set region RG and the subject region RO, and the first weight W1 and the second weight W2 are decided.

As described above, in the present modification example, in a case where the ratio R1 of the size of the subject region RO to the size of the set region RG is smaller than the first threshold value and the absolute value of the difference between the first exposure value E1 and the second exposure value E2 is smaller than the second threshold value, the weight decision unit 65 decides the first weight W1 and the second weight W2 regardless of the positional relationship between the set region RG and the subject region RO.

In a case where the importance of the subject region RO is low and the difference in brightness from the background is small, the third exposure value E3 is less likely to be influenced by the second exposure value E2 of the subject region RO. However, in such a case, in a case where the correction coefficient β is decided based on the positional relationship between the set region RG and the subject region RO, the third exposure value E3 is changed in accordance with a change in the positional relationship, and unnecessary flickering may occur in brightness of the set region RG. In the present modification example, in a case where the importance of the subject region RO is low and the difference in brightness from the background is small, the first weight W1 and the second weight W2 are decided regardless of the positional relationship. Therefore, it is possible to prevent unnecessary flickering in brightness of the set region RG.

Second Modification Example

In the first modification example, the weight decision unit 65 decides the first weight W1 and the second weight W2 by using the first exposure value E1 and the second exposure value E2 in addition to the result of the first determination and the result of the second determination. On the other hand, the first weight W1 and the second weight W2 may be decided in consideration of the information of the subject included in the subject region RO.

The configuration of the exposure value calculation unit 56 according to the present modification example is the same as that of the first modification example, except that the weight decision unit 65 acquires the information of the subject included in the subject region RO from the subject region acquisition unit 55.

Figure 15:
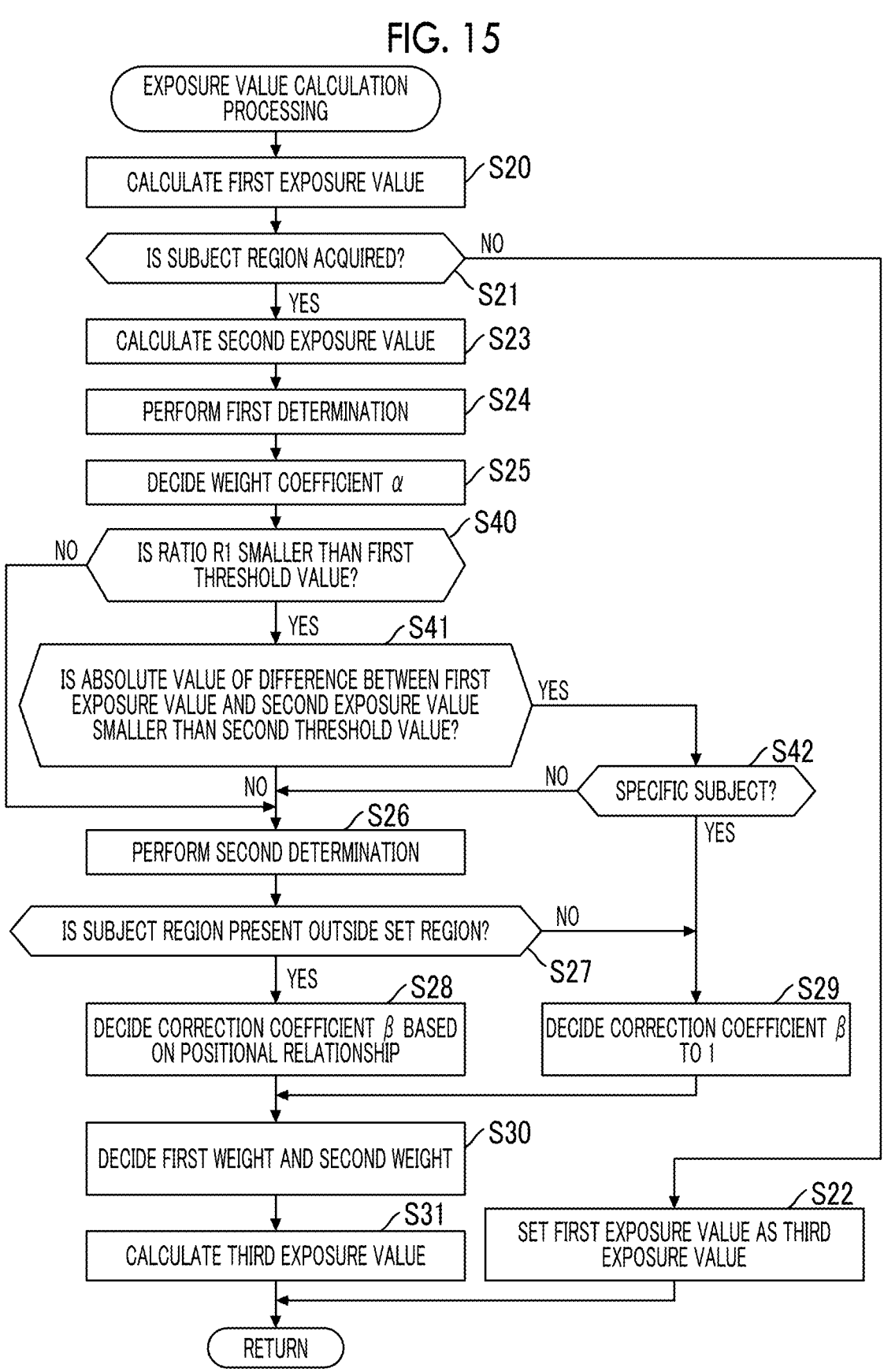
FIG. 15 is a flowchart illustrating a flow of exposure value calculation processing according to a second modification example.

FIG. 15 illustrates a flow of exposure value calculation processing according to the second modification example. The exposure value calculation processing according to the present modification example is different from the exposure value calculation processing according to the first modification example illustrated in FIG. 14 in that step S42 is added between step S41 and step S29.

In a case where the absolute value of the difference between the first exposure value E1 and the second exposure value E2 is smaller than the second threshold value (YES in step S41), the weight decision unit 65 determines whether or not the subject included in the subject region RO is a specific subject (step S42). The type of the specific subject is stored in the memory 42 in advance as data. For example, the specific subject is an object such as a drone that moves at a high speed or a bird. The specific subject is a subject that can move at a high speed in the image represented by the image signal D. Note that the user may set the type of the specific subject by using the operating device 13. The specific subject is a subject that is optionally selected by an engineer or a user.

In a case where the subject included in the subject region RO is not the specific subject (NO in step S42), the processing proceeds to step S26. That is, even in a case where the importance of the subject region RO is low and the difference in brightness from the background is small, the same processing as in the embodiment is performed in a case where the subject included in the subject region RO is not the specific subject.

On the other hand, in a case where the subject included in the subject region RO is the specific subject (YES in step S42), the processing proceeds to step S29, and the correction coefficient β is decided to 1. That is, in a case where the importance of the subject region RO is low, the difference in brightness from the background is small, and the subject included in the subject region RO is the specific subject, the correction coefficient β is decided to 1 regardless of the positional relationship between the set region RG and the subject region RO, and the first weight W1 and the second weight W2 are decided.

As described above, in the present modification example, in a case where the ratio R1 of the size of the subject region RO to the size of the set region RG is smaller than the first threshold value, the absolute value of the difference between the first exposure value E1 and the second exposure value E2 is smaller than the second threshold value, and the subject included in the subject region RO is the specific subject, the weight decision unit 65 decides the first weight W1 and the second weight W2 regardless of the positional relationship between the set region RG and the subject region RO.

In a case where the subject included in the subject region RO is a specific subject that moves at a high speed, the positional relationship between the set region RG and the subject region RO is likely to change. As a result, unnecessary flickering may occur in brightness of the set region RG. In the present modification example, in a case where the subject included in the subject region RO is the specific subject, the first weight W1 and the second weight W2 are decided regardless of the positional relationship between the set region RG and the subject region RO. Therefore, it is possible to prevent unnecessary flickering in brightness of the set region RG.

Third Modification Example

In the embodiment, the subject region acquisition unit 55 acquires the subject region RO by a template matching method. On the other hand, the subject region RO may be acquired by using a machine-trained model.

Figure 16:
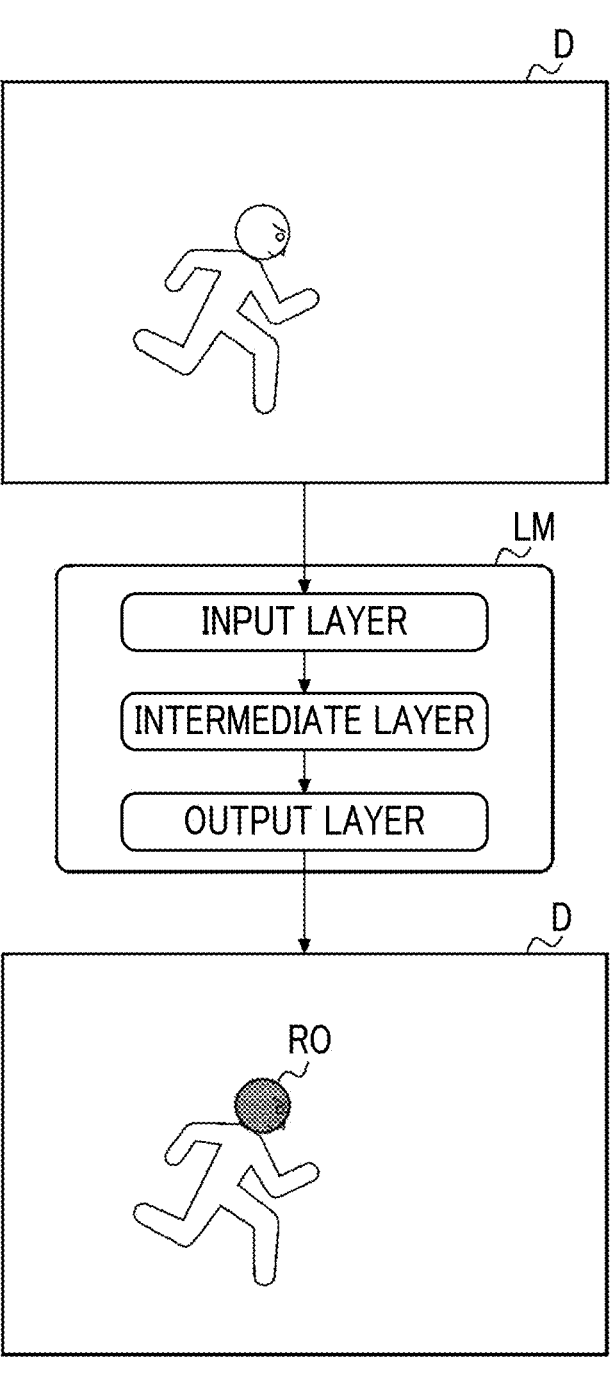
FIG. 16 is a diagram illustrating subject region acquisition processing according to a third modification example.

FIG. 16 illustrates subject region acquisition processing according to the third modification example. As illustrated in FIG. 16, the machine-trained model LM is configured with a neural network including an input layer, an intermediate layer, and an output layer. The intermediate layer includes a plurality of neurons. The number of the intermediate layers and the number of neurons in each intermediate layer can be changed as appropriate. For example, the trained model LM is a CNN. The machine-trained model LM is obtained by performing machine learning using a plurality of images including a predetermined subject region as training data.

The subject region acquisition unit 55 inputs the image signal D to the machine-trained model LM. The machine-trained model LM specifies the subject region RO from the image represented by the image signal D, and outputs the specified subject region RO. For example, the machine-trained model LM outputs, as a heat map, a result obtained by performing segmentation for each pixel. For example, in a case where the subject to be acquired is a face of a person, a set of pixels of which the class belongs to a face of a person is specified as the subject region RO.

As described above, the subject region RO is acquired using the machine-trained model, and thus the subject region RO is acquired with high accuracy. Therefore, in the first determination, it is possible to determine the positional relationship between the set region RG and the subject region RO with higher accuracy. Thereby, it is possible to prevent an inappropriate variation in brightness of the set region RG with higher accuracy.

Other Modification Examples

In the embodiment, the set region RG is used as an image display region for displaying an image in the set region RG. On the other hand, the set region RG may be an image recording region for recording an image in the set region RG. In this case, the image in the set region RG is recorded in a storage device, such as the memory 42, as moving image data.

Figure 17:
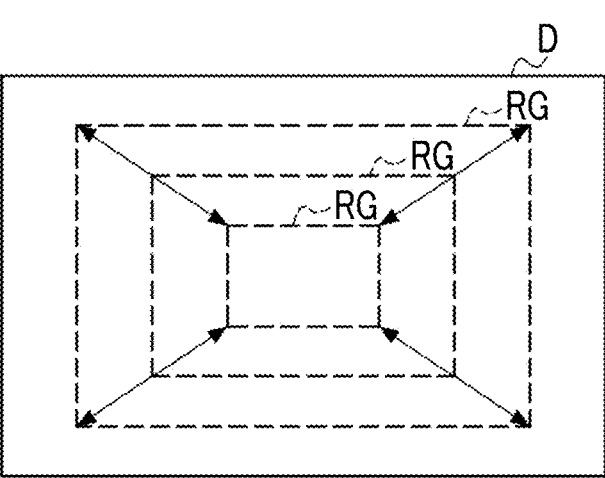
FIG. 17 is a diagram illustrating an example in which a set region is an image cutout region for electronic zoom.
Figure 18:
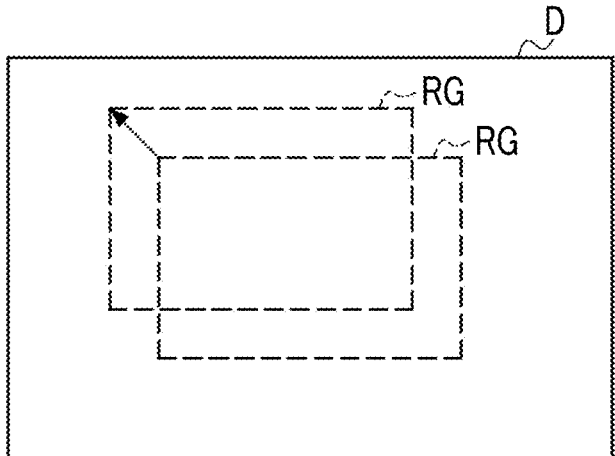
FIG. 18 is a diagram illustrating an example in which a set region is an image cutout region for camera shake correction.

In addition, the set region RG may be an image cutout region for electronic zoom. In this case, as illustrated in FIG. 17, the size of the set region RG is changed in accordance with the zoom magnification of the electronic zoom. Specifically, the set region RG decreases as the zoom magnification of the electronic zoom increases.

In addition, the set region RG may be an image cutout region for camera shake correction. In this case, as illustrated in FIG. 17, the position of the set region RG is changed to cancel out the camera shake based on an output signal from an angular velocity sensor (not illustrated) such as a gyro sensor provided in the imaging apparatus 10.

In addition, in the embodiment, the first determination unit 63 determines the ratio R1 of the size of the subject region RO to the size of the set region RG as the importance of the subject region RO with respect to the set region RG. On the other hand, the importance is not limited to the ratio R1. For example, the importance may be a type of the subject. In this case, the weight decision unit 65 increases the weight coefficient α as the type of the subject has higher importance.

In addition, in the embodiment, the positional relationship between the set region RG and the subject region RO is determined based on the centroid P of the subject region RO. On the other hand, the criterion for determining the positional relationship is not limited to the centroid P of the subject region RO. For example, it may be determined that the subject region RO is present outside the set region RG in a case where at least a part of the subject region RO is present outside the set region RG, and it may be determined that the subject region RO is present in the set region RG in a case where the entire subject regions RO is present in the set region RG. On the contrary, it may be determined that the subject region RO is present in the set region RG in a case where at least a part of the subject region RO is present in the set region RG, and it may be determined that the subject region RO is present outside the set region RG in a case where the entire subject regions RO is present outside the set region RG.

In addition, in the embodiment, the imaging apparatus 10 is a digital camera. On the other had, the imaging apparatus 10 may be a surveillance camera. In this case, the display 15 may be a monitor of a personal computer connected to the surveillance camera from the outside. In addition, the operating device 13 may be a keyboard, a mouse, or the like of the personal computer connected to the surveillance camera from the outside.

In addition, the technology of the present disclosure can also be applied to electronic apparatuses such as smartphones and tablet terminals having an imaging function.

In the above-described embodiment, various processors to be described below can be used as the hardware structure of the controller using the processor 40 as an example. The above-described various processors include not only a CPU which is a general-purpose processor that functions by executing software (programs) but also a processor that has a changeable circuit configuration after manufacturing, such as an FPGA. The FPGA includes a dedicated electrical circuit that is a processor which has a dedicated circuit configuration designed to execute specific processing, such as PLD or ASIC, and the like.

The controller may be configured by one of these various processors or a combination of two or more of the processors of the same type or different types (for example, a combination of a plurality of FPGAs or a combination of a CPU and an FPGA). Alternatively, a plurality of controllers may be configured with one processor.

A plurality of examples in which a plurality of controllers are configured as one processor can be considered. As a first example, there is an aspect in which one or more CPUs and software are combined to configure one processor and the processor functions as a plurality of controllers, as represented by a computer such as a client and a server. As a second example, there is an aspect in which a processor that implements the functions of the entire system, which includes a plurality of controllers, with one IC chip is used, as represented by system-on-chip (SOC). In this way, the controller can be configured by using one or more of the above-described various processors as the hardware structure.

Furthermore, more specifically, it is possible to use an electrical circuit in which circuit elements such as semiconductor elements are combined, as the hardware structure of these various processors.

In addition, the program may be stored in a non-transitory computer readable storage medium.

The described contents and the illustrated contents are detailed explanations of a part according to the technology of the present disclosure, and are merely examples of the technology of the present disclosure. For example, the descriptions related to the configuration, the function, the operation, and the effect are descriptions related to examples of a configuration, a function, an operation, and an effect of a part according to the technology of the present disclosure. Therefore, it goes without saying that, in the described contents and illustrated contents, unnecessary parts may be deleted, new components may be added, or replacements may be made without departing from the spirit of the technology of the present disclosure. Further, in order to avoid complications and facilitate understanding of the part according to the technology of the present disclosure, in the described contents and illustrated contents, descriptions of technical knowledge and the like that do not require particular explanations to enable implementation of the technology of the present disclosure are omitted.

All documents, patent applications, and technical standards described in this specification are incorporated herein by reference to the same extent as in a case where each document, each patent application, and each technical standard are specifically and individually described by being incorporated by reference.

The following technology can be understood by the above description.

APPENDIX 1

An exposure control device comprising:
a processor; and
a memory,
in which the processor is configured to:
    acquire an image signal output from an imaging element;
    acquire a specific subject region in an image represented by the image signal;
    calculate a first exposure value of a set region that is set in the image and a second exposure value of the subject region;
    decide a first weight for the first exposure value and a second weight for the second exposure value based on first determination of determining importance of the subject region with respect to the set region and second determination of determining a positional relationship between the set region and the subject region; and
    calculate a third exposure value by performing weight addition on the first exposure value and the second exposure value using the first weight and the second weight.

APPENDIX 2

The exposure control device according to Appendix 1,
in which the processor is configured to decide the first weight and the second weight regardless of the positional relationship in a case where it is determined in the second determination that the subject region is present in the set region.

APPENDIX 3

The exposure control device according to Appendix 1 or Appendix 2,
in which the processor is configured to decide the first weight and the second weight based on the positional relationship in a case where it is determined in the second determination that the subject region is present outside the set region.

APPENDIX 4

The exposure control device according to any one of Appendix 1 to Appendix 3,
in which the processor is configured to:
    decide a weight coefficient based on a result of the first determination; and
    decide a correction coefficient based on a result of the second determination.

APPENDIX 5

The exposure control device according to Appendix 4,
in which the processor is configured to:
    assuming that the first exposure value is E1, the second exposure value is E2, the third exposure value is E3, the first weight is W1, the second weight is W2, the weight coefficient is $\alpha$, and the correction coefficient is $\beta$,
    decide the first weight and the second weight such that W1=1−$\alpha$×$\beta$ and W2=$\alpha$×$\beta$ are satisfied; and
    calculate the third exposure value based on E3=E1× W1+E2×W2.

APPENDIX 6

The exposure control device according to Appendix 4 or Appendix 5,
in which the processor is configured to decide the correction coefficient to 1 in a case where it is determined in the second determination that the subject region is present in the set region.

APPENDIX 7

The exposure control device according to any one of Appendix 4 to Appendix 6,
in which the processor is configured to decide the correction coefficient based on the positional relationship in a case where it is determined in the second determination that the subject region is present outside the set region.

APPENDIX 8

The exposure control device according to any one of Appendix 4 to Appendix 7,
in which the positional relationship includes a distance between the set region and the subject region.

APPENDIX 9

The exposure control device according to Appendix 8,
in which the correction coefficient decreases as the distance increases.

APPENDIX 10

The exposure control device according to any one of Appendix 1 to Appendix 9, in which the first determination is determination based on a ratio of a size of the subject region to a size of the set region.

APPENDIX 11

The exposure control device according to Appendix 10, in which the processor is configured to decide the first weight and the second weight regardless of the positional relationship in a case where the ratio of the size of the subject region to the size of the set region is smaller than a first threshold value and an absolute value of a difference between the first exposure value and the second exposure value is smaller than a second threshold value.

APPENDIX 12

The exposure control device according to Appendix 10, in which the processor is configured to decide the first weight and the second weight regardless of the positional relationship in a case where the ratio of the size of the subject region to the size of the set region is smaller than a first threshold value, an absolute value of a difference between the first exposure value and the second exposure value is smaller than a second threshold value, and a subject included in the subject region is a specific subject.

APPENDIX 13

The exposure control device according to any one of Appendix 1 to Appendix 12, in which the subject region is a face region of a person.

APPENDIX 14

The exposure control device according to any one of Appendix 1 to Appendix 13, in which the processor is configured to acquire the subject region by using a machine-trained model.

APPENDIX 15

The exposure control device according to any one of Appendix 1 to Appendix 14, in which the set region is an image display region for displaying an image in the set region, an image recording region for recording an image in the set region, or an image cutout region for electronic zoom or camera shake correction.

APPENDIX 16

An imaging apparatus comprising:

the exposure control device according to any one of Appendix 1 to Appendix 15; and the imaging element.

What is claimed is:

1. An exposure control device comprising:

a processor; and a memory, wherein the processor is configured to:

acquire an image signal output from an imaging element;

acquire a specific subject region in an image represented by the image signal;

calculate a first exposure value of a set region that is set in the image and a second exposure value of the subject region;

decide a first weight for the first exposure value and a second weight for the second exposure value based on first determination of determining a ratio of a size of the subject region with respect to a size of the set region and second determination of determining a positional relationship between the set region and the subject region; and calculate a third exposure value by performing weight addition on the first exposure value and the second exposure value using the first weight and the second weight.

2. The exposure control device according to claim 1, wherein the processor is configured to decide the first weight and the second weight regardless of the positional relationship in a case where it is determined in the second determination that the subject region is present in the set region.

3. The exposure control device according to claim 2, wherein the processor is configured to decide the first weight and the second weight based on the positional relationship in a case where it is determined in the second determination that the subject region is present outside the set region.

4. The exposure control device according to claim 1, wherein the processor is configured to:

decide a weight coefficient based on a result of the first determination; and decide a correction coefficient based on a result of the second determination.

5. The exposure control device according to claim 4, wherein the processor is configured to:

assuming that the first exposure value is E1, the second exposure value is E2, the third exposure value is E3, the first weight is W1, the second weight is W2, the weight coefficient is $\alpha$, and the correction coefficient is $\beta$, decide the first weight and the second weight such that $W1=1-\alpha\times\beta$ and $W2=\alpha\times\beta$ are satisfied; and calculate the third exposure value based on $E3=E1\times W1+E2\times W2$.

6. The exposure control device according to claim 5, wherein the processor is configured to decide the correction coefficient to 1 in a case where it is determined in the second determination that the subject region is present in the set region.

7. The exposure control device according to claim 6, wherein the processor is configured to decide the correction coefficient based on the positional relationship in a case where it is determined in the second determination that the subject region is present outside the set region.

8. The exposure control device according to claim 7, wherein the positional relationship includes a distance between the set region and the subject region.

9. The exposure control device according to claim 8, wherein the correction coefficient decreases as the distance increases.

10. The exposure control device according to claim 1, wherein the processor is configured to decide the first weight and the second weight regardless of the positional relationship in a case where the ratio of the size of the subject region to the size of the set region is smaller than a first threshold value and an absolute value of a difference between the first exposure value and the second exposure value is smaller than a second threshold value.

11. The exposure control device according to claim 1, wherein the processor is configured to decide the first weight and the second weight regardless of the positional relationship in a case where the ratio of the size of the subject region to the size of the set region is smaller than a first threshold value, an absolute value of a difference between the first exposure value and the second exposure value is smaller than a second threshold value, and a subject included in the subject region is a specific subject.

12. The exposure control device according to claim 1, wherein the subject region is a face region of a person.

13. The exposure control device according to claim 1, wherein the processor is configured to acquire the subject region by using a machine-trained model.

14. The exposure control device according to claim 1, wherein the set region is an image display region for displaying an image in the set region, an image recording region for recording an image in the set region, or an image cutout region for electronic zoom or camera shake correction.

15. An imaging apparatus comprising:
the exposure control device according to claim 1; and
the imaging element.

16. An exposure control method comprising:
via a processor,
acquiring an image signal output from an imaging element;
acquiring a specific subject region in an image represented by the image signal;
calculating a first exposure value of a set region that is set in the image and a second exposure value of the subject region;

deciding a first weight for the first exposure value and a second weight for the second exposure value based on first determination of determining a ratio of a size of the subject region with respect to a size of the set region and second determination of determining a positional relationship between the set region and the subject region; and calculating a third exposure value by performing weight addition on the first exposure value and the second exposure value using the first weight and the second weight.

17. A non-transitory computer-readable storage medium storing a program causing a processor to execute a process comprising:
acquiring an image signal output from an imaging element;
acquiring a specific subject region in an image represented by the image signal;
calculating a first exposure value of a set region that is set in the image and a second exposure value of the subject region;
deciding a first weight for the first exposure value and a second weight for the second exposure value based on first determination of determining a ratio of a size of the subject region with respect to a size of the set region and second determination of determining a positional relationship between the set region and the subject region; and
calculating a third exposure value by performing weight addition on the first exposure value and the second exposure value using the first weight and the second weight.

* * * * *